(12) United States Patent
McLachlan (10) Patent No.: US 6,993,616 B2
(45) Date of Patent: Jan. 31, 2006

(54) READ-WRITE INTERFACE SYSTEM AND METHOD THAT ACCESSES A LEADING BIT IN ADVANCE OF A READ OPERATION

(75) Inventor: Roderick Christie McLachlan, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 352 days.

(21) Appl. No.: 10/261,646

(22) Filed: Oct. 1, 2002

(65) Prior Publication Data
US 2004/0064608 A1 Apr. 1, 2004

(51) Int. Cl.
G06F 13/14 (2006.01)

(52) U.S. Cl. ............................ 710/305; 710/71; 710/29
(58) Field of Classification Search ................ 710/305, 710/71, 29, 62
See application file for complete search history.

(56) References Cited

U.S. PATENT DOCUMENTS

| | | | | |
|---|---|---|---|---|
| 4,648,105 A | * | 3/1987 | Priebe et al. ................. 377/64 |
| 5,128,666 A | * | 7/1992 | Munier et al. ............... 324/309 |
| 5,303,227 A | * | 4/1994 | Herold et al. ............... 370/276 |
| 5,361,260 A | * | 11/1994 | Mito ............................ 370/452 |
| 5,799,211 A | * | 8/1998 | Hakkarainen et al. ........ 710/71 |
| 5,995,988 A | * | 11/1999 | Freidin et al. ............... 708/232 |
| 6,122,683 A | * | 9/2000 | Ku et al. ...................... 710/71 |
| 6,499,070 B1 | * | 12/2002 | Whetsel ....................... 710/71 |
| 6,792,494 B2 | * | 9/2004 | Bennett et al. .............. 710/302 |

OTHER PUBLICATIONS

Keshab Parhi and Joo-Sang Lee, "Register Allocation For Design of Data Format Converters", 1991, IEEE 1991 International Conference, Apr. 14-17, 1991, pp1133-1136.*
Analog Devices, Inc., "AD5531 Datasheet" Rev. 0 (2002), available at http://products.analog.com/products/info.asp?product=AD5531.

* cited by examiner

Primary Examiner—Khanh Dang
Assistant Examiner—Justin King
(74) Attorney, Agent, or Firm—Iandiorio & Teska (57) ABSTRACT

A read-write interface system and method for a peripheral device includes storing data to be processed by a peripheral device; receiving a set of input data bits; transferring the set of input data bits from the shift register to the latch circuit in a write operation; accessing a leading bit of the set of input data bits from the latch circuit in advance of a read operation; and enabling in a read operation the rest of the input data bits in the latch circuit to be transferred to the shift register to be output with the leading bit.

10 Claims, 7 Drawing Sheets

READ-WRITE INTERFACE SYSTEM AND METHOD THAT ACCESSES A LEADING BIT IN ADVANCE OF A READ OPERATION

FIELD OF THE INVENTION

This invention relates to a read-write interface system and method for a peripheral device and more specifically to such an interface system which needs only five lines for a true read-write function and is compatible with daisy chain operations.

BACKGROUND OF THE INVENTION

A serial peripheral interface (SPI), is a three wire or three line serial interface which uses a control unit to write data to an internal latch in a peripheral device. The three lines or wires are SYNCB, SDIN, and SCLK. SYNCB controls the time period when the controlling unit is writing to the peripheral device. When SYNCB is low, writing is taking place. When SYNCB is high, the peripheral device updates the internal latch to complete the write operation and ignores any other signals it receives. SDIN is a serial-data-in line which provides data that the controlling unit is writing to the peripheral device. SCLK carries the clock signal. It controls clocking in of the data that the controlling unit writes to the peripheral device during the period when the SYNCB signal is low. On each positive going SCLK edge, data on the SDIN line is sampled or brought into a shift register. Later, when the SYNCB line goes high, this data is moved into the internal latch. The peripheral device then processes the data which is present in the internal latch. The addition of a fourth wire or line serial data out (SDO) enables daisy chaining. The SDO line provides a copy of the SDIN data delayed by a number of clock signals. For example, where the data being read in is in 4-bit sets in the shift register and the internal latch, the copy of the data on the SDO line is a copy of the data on the SDIN line delayed by four clock cycles. In this way, it is possible to daisy chain several peripheral devices by connecting the SDO of one to the SDIN of the next. All of the peripheral devices, therefore share common SCLK and SYNCB signals. Then, if SYNCB is held low for a multiple of the data width, e.g., in this case four, then all but the last four bits of SDIN data pass through the first peripheral device from its SDIN input to its SDO output and to a second device or third or fourth. When the SYNCB line returns high, the internal four-bit latch in each of the peripheral devices can be simultaneously updated. In effect, the shift registers in each peripheral device are interconnected to create an effectively longer shift register distributed among several peripheral devices. In some implementations, it is desirable to update the internal latch from the shift register sometime after the write operation into the shift register has been completed. For this purpose, a fifth line called LOADB is used. Under these circumstances the internal latch is not updated at the end of a write when SYNCB returns high but rather is updated when the LOADB line is low. In some cases, it is desirable to know what value is in the internal latch, that is the value that is currently being processed by the peripheral device. Reading back this value in the latch is called read-back and requires yet another, sixth, line, the READB line. When the READB line goes low, and provided that the SYNCB line is high, the set of bits in the internal latch is read out to the shift register where it is provided on the SDO line.

While the present six wire or line system provides full read-write capability, it does have a shortcoming in that the transfer of the data bits from the internal latch to the shift register does not occur immediately when the READB line goes low but instead only upon the first rising edge of the CLK signal after the READB line goes low. This introduces a one clock cycle shift in the output on SDO with respect to the input on SDIN and so precludes daisy chaining. See U.S. Pat. Nos. 5,303,227; 5,128,666; 5,361,260; and Analog Devices, Inc. "AD5531 Datasheet" Rev O, 2002, http://products.analog.com/products/info.asp?product=AD5531

BRIEF SUMMARY OF THE INVENTION

It is therefore an object of this invention to provide an improved read-write interface system and method for peripheral device.

It is a further object of this invention to provide such an improved read-write interface system and method which enables true read-write functionality using only five lines.

It is a further object of this invention to provide such an improved read-write interface system and method which avoids a phase shift between the data input and data output lines enabling daisy chaining of peripheral devices.

The invention results from the realization that a true read-write interface system and method for peripheral devices can be effected using only fives lines and preserving the capability for daisy chaining by combining, for a read operation, both the write (SYNCB) and read (READB) control in the SYNCB signal and avoiding the implicit conflict between the data input (SDIN) and data output (SDO) by accessing the leading bit (be it MSB or LSB) directly from the latch circuit and accessing the remaining bits from the shift register and reuniting them at the output.

This invention features a read-write interface system for a peripheral device including a latch circuit for storing data to be processed by a peripheral device and a shift register for receiving a set of input data bits. A latch enable circuit transfers the set of input data bits from the shift register to the latch circuit in a write operation. A select circuit accesses a leading bit of the set of input data bits from the latch circuit in advance of a read operation. And a parallel LOADB circuit enables in a read operation the rest of the input data bits in the latch circuit to be transferred to the shift register to be output with the leading bit.

This invention also features a five line read-write interface system for a peripheral device including a latch circuit for storing data to be processed by a peripheral device and a shift register for receiving on an input line a set of input data bits. A latch enable circuit responsive to a LOADB line and a SYNCB line, transfers the set of input data bits from the shift register to the latch circuit in a write operation. A select circuit responsive to an SCLK line and the SYNCB line delivers to an output line a leading bit of the input data bits from the latch circuit before the next cycle of the clock signal on the SCLK line in advance of a read operation. A parallel LOADB circuit responds to the SCLK and SYNCB lines for enabling in a read operation the rest of the input data bits in the latch circuit to be transferred to the shift register and reunited with the leading bit at the output line.

The invention also features a five line read-write interface method for a peripheral device which includes a latch circuit for storing data to be processed by a peripheral device, a shift register for receiving on an input line a set of input data bits and a latch enable circuit responsive to a LOADB line and a SYNCB line for transferring the set of input data bits from the shift register to the latch circuit in a write operation. The invention also features a method including delivering to an output line in response to a clock signal and the SYNCB signal a leading bit of the input data bits from the latch circuit before the next cycle of the clock signal in advance of a read operation and enabling in a read operation the rest of the input data bits in the latch circuit to be transferred to the shift register and reunited with the leading bit at the output line.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
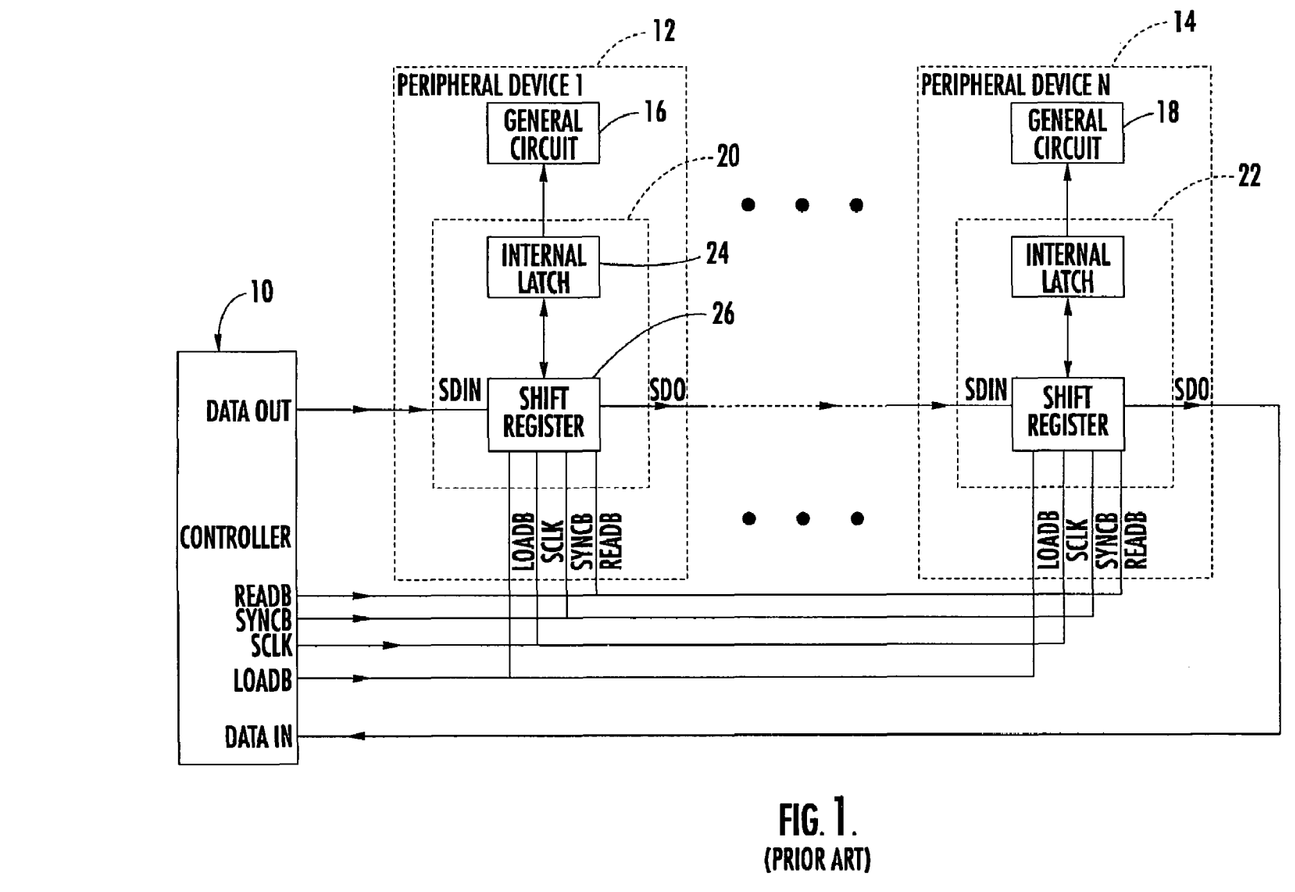
FIG. 1 is a block diagram of a controller and peripheral devices using a prior art six line interface system.

There is shown in FIG. 1 a controller 10 for writing data to and reading data from a number of peripheral devices: 1 through n, where the first is referred to as 12 and the last or nth as 14. Each peripheral device includes general circuit 16, 18 which characterizes the particular peripheral device and an interface system 20, 22 which effects the reading and writing of data from controller 10. Each interface system, as exemplified by interface system 20, includes means, including an internal latch 24 and means including a shift register 26 and is controlled over six wires or lines or pins: serial data in SDIN, serial data out SDO, LOADB, the clock signal SCLK, SYNCB and READB. The suffix B simply indicates "bar" or "not" indicating the opposite or complement of the signal proper. The data out line from controller 10 converts to the SDIN line to shift register 26 while the SDO line out of shift register 26 becomes the SDIN line to the next shift register in the next interface of the next peripheral device. The SDO output of the last device then becomes the data in signal to controller 10.

Figure 2:
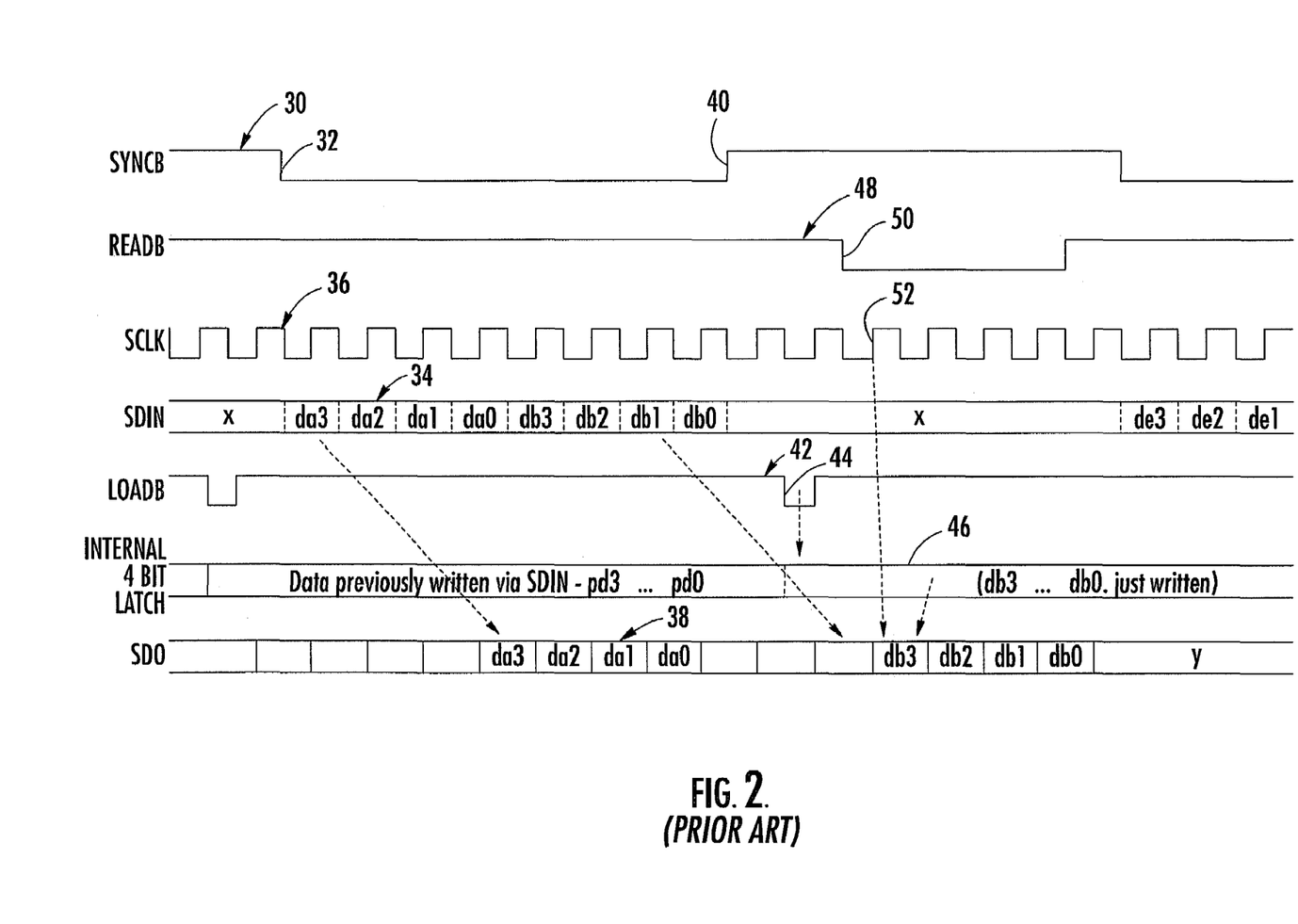
FIG. 2 illustrates waveforms associated with operation of the interface systems of FIG. 1.

In operation, as shown in FIG. 2, with respect to an individual device, when the SYNCB signal 30 goes low as at 32, the data 34, da3–da0, db3–db0, is clocked in to shift register 26, FIG. 1 on each cycle of the clock signal SCLK 36. This data 38 appears delayed by four clock cycles on the SDO line. Sometime after SYNCB signal 30 goes high as at 40, LOADB signal 42 goes low as at 44. This causes the data 34 at SDIN now present in the shift register to be transferred into the internal latch 46 where it is referred to as "db3 . . . db0, just written." This completes the writing of the data which is now in the internal latch and is available to be processed by the peripheral device.

At a subsequent time in this prior art six line device, a read operation may begin by the READB signal 48 going low as at 50. The first positive going clock edge 52 following the dropping at 50 of the READB line 48 causes the data (4 bits) in latch 24 to be transferred back to shift register 26. Thus the data what was transferred from the internal latch 24 to the shift register 26 is shifted out or read out on SDO on first positive clock edge 52 and subsequent clock edges. But, this prior art system operates using six wires to effect read and write operations and is prevented from implementing a daisy chain system because of the loss of the clock cycle when the data is read from the internal latch 24 back to shift register 26.

Figure 3:
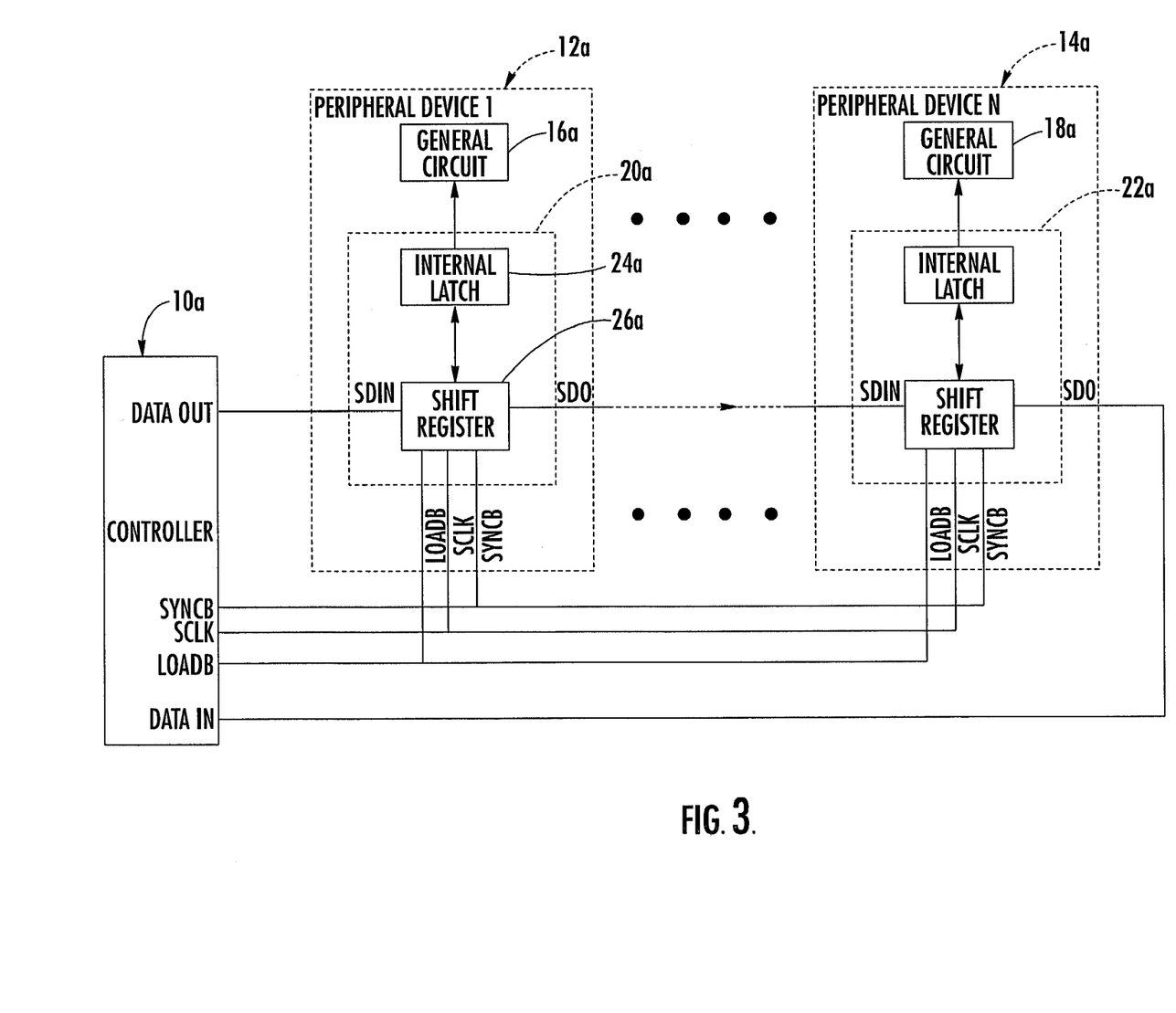
FIG. 3 is a block diagram of a controller and peripheral devices using a five line interface system according to this invention.
Figure 4:
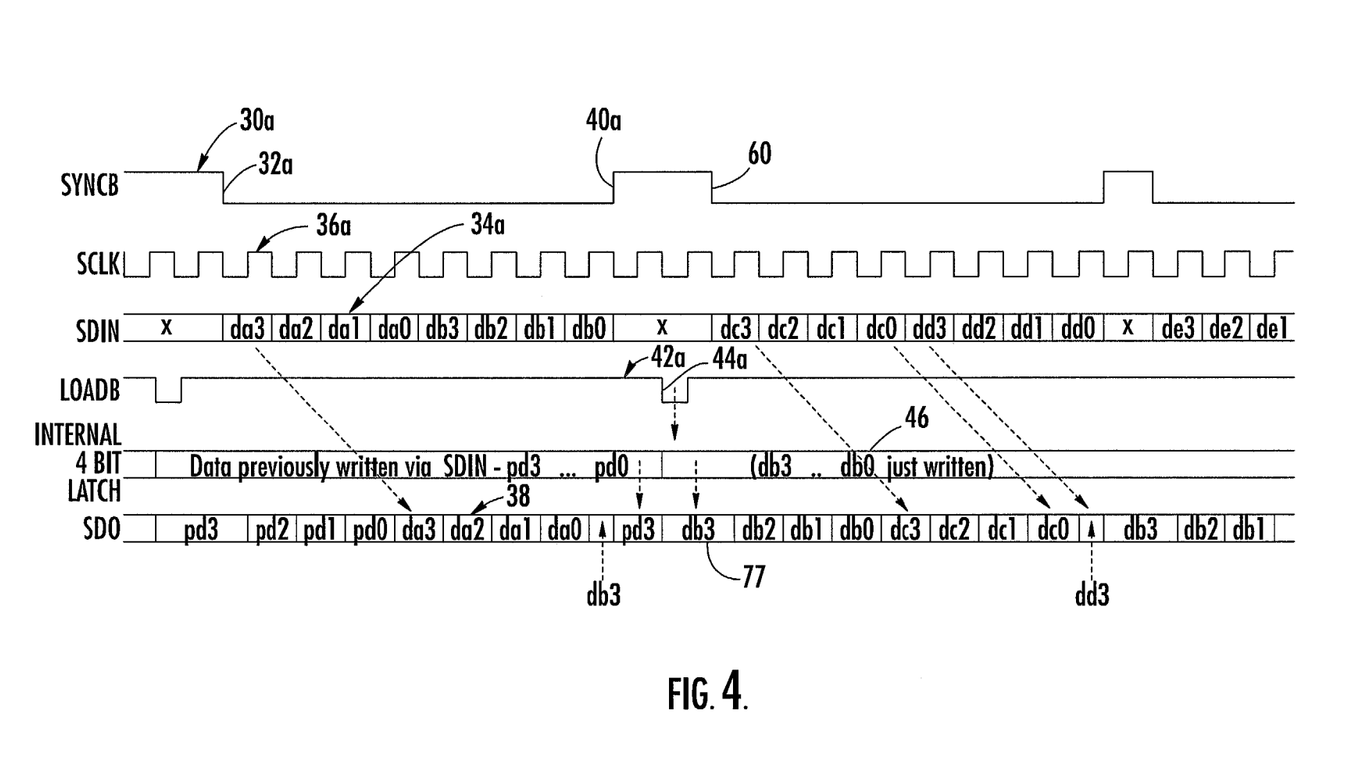
FIG. 4 illustrates waveforms associated with operation of the interface systems of FIG. 3.

In accordance with this invention controller 10a, FIG. 3, need provide only five lines or wires or pins. Its data out line still provides the SDIN input line to shift register 26a and the SDO line of each peripheral device still provides the SDIN line to the next peripheral device while the last peripheral device output SDO is delivered back to the data in pin of controller 10a. Controller 10a still provides the SYNCB, SCLKB, and LOADB signals. But it does not provide the READB signal, for now the READB signal has its function combined with that of the SYNCB signal to eliminate a line so that it can operate with only five lines and still provide a true read-write function. This is illustrated with respect to waveforms in FIG. 4 where it can be seen that the write operation operates as before, that is, when SYNCB signal 30a goes low as at 32a, SCLK signal 36a clocks in the data 34a on SDIN with each clock cycle. And also similarly, after SYNCB signal 30 goes high again as at 40a, the LOADB signal 42a may go low as at 44a to transfer the data 34a which is in shift register 26a into internal latch 24a, at 46 indicated as (db3 . . . db0, just written). Note here however, that as soon as the LOADB signal goes low at 44a, the db3 bit, of the data 46 in internal latch 24a is immediately present at the output SDO. There is no delay as with prior art devices.

Thus, when this modified SYNCB signal which combines the functions of the SYNCB and READB signals of the prior art goes low once again at 60, there is no time lag: db3 is already present at SDO. This is accomplished in accordance with one embodiment of this invention, by the interface system 20a shown in more detail in FIG. 5. In accomplishing this avoidance of the delay which occurs in the prior art, the shift register 26a according to this invention also resolves an implicit conflict in the joining of the functions of the READB and SYNCB signals in a single SYNCB signal 30a. Explicitly, referring again to FIG. 4, during the read operation, when SYNCB signal 30a goes low once again as at 60 and the data in internal latch 24a is shifted back to shift register 26a a write operation is also being instituted by the same low going transition 60 of SYNCB signal 30a so that the next four bits of data will be present at SDIN. The leading bit of which, which may be an MSB or LSB, will be competing for the first stage of the shift register with the data coming from internal latch 24a. But in accordance with this invention, this implicit conflict is resolved by providing the leading bit, whether it be MSB or LSB directly to the SDO line, leaving the lead position open for the first bit of the incoming data on SDIN. This permits the use of only five wires in place of six to still accomplish true read-write operations and at the same time overcomes the delay in the prior art that makes prior art devices unsuitable for daisy chaining but allows this invention to accommodate it.

Figure 5:
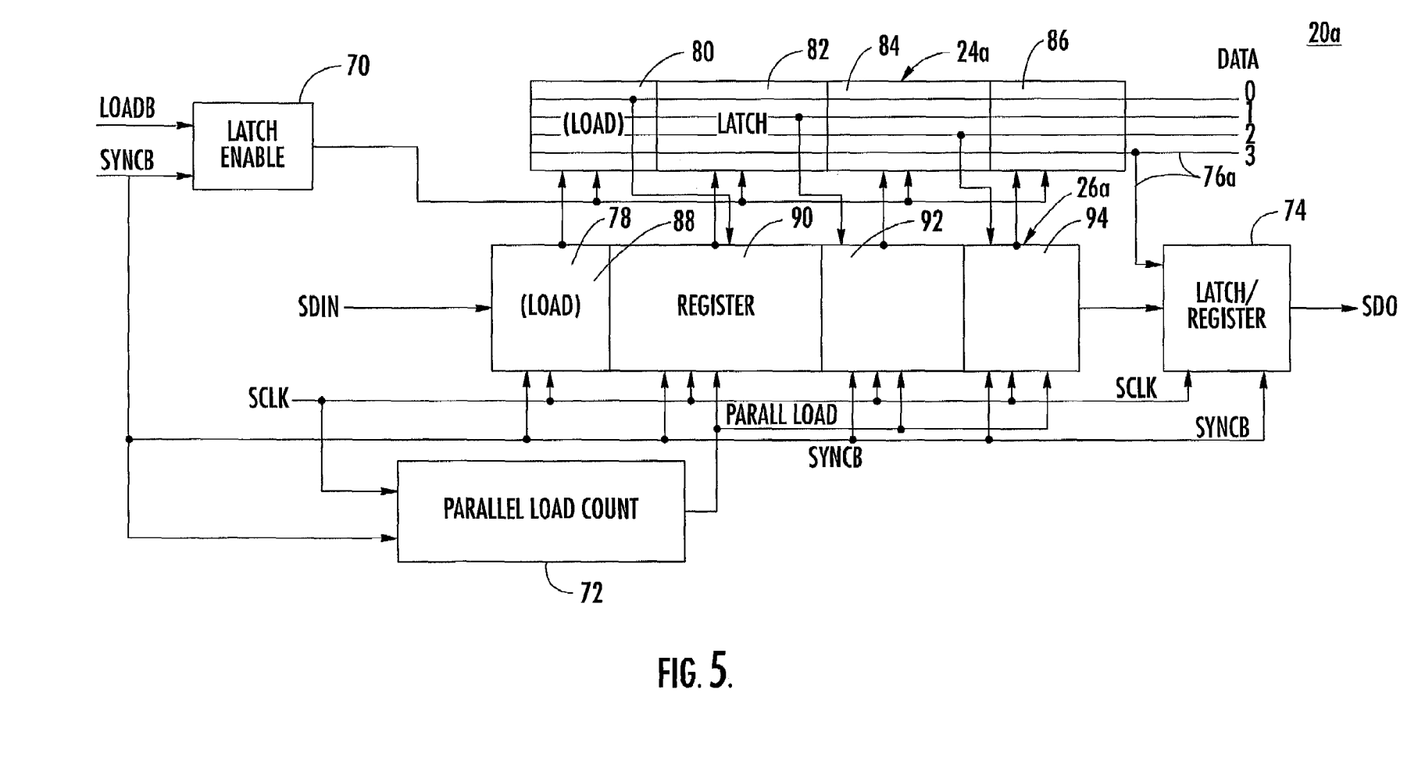
FIG. 5 is a schematic block diagram of an interface system according to this invention.

Interface system 20a, FIG. 5 includes latch 24a and register 26a. Means such as latch enable circuit 70 responds to the LOADB and SYNCB signals to provide a latch enable signal to transfer the set of data bits in register 26a into latch 24a to complete the write operation. Means such as parallel load circuit 72 responds to the SYNCB signal and the SCLK signal to internally produce the parallel load signal to register 26a to cause it to load from latch 24a all of the data bits of the set of data bits in latch 24a with the exception of the lead bit.

The lead bit may be the most significant bit MSB, or the least significant bit LSB depending upon the orientation of the data in the register and latch. The lead bit, to be read back in the last stage of the latch is not delivered at this point from latch 24a to register 26a. Rather, latch/register select circuit 74 addresses this task in response to the SCLK signal and SYNCB signal. When the SYNCB signal is high, means such as latch/register select circuit 74 will take the lead bit in this case (from latch stage 86) on line 76 and provide it on the output line SDO so that it is there present as shown at 77 in FIG. 4 in advance of a read operation. Thus when a read operation begins with the going low 60 of SYNCB signal 30a, FIG. 4, db3, is already present at SDO, and when the combination of the SCLK and SYNCB signal causes the parallel load circuit 72 in FIG. 5 to produce the parallel load signal to enable reading out the remaining bits from register 26a to latch/register select circuit 74 the entire set of bits, in this case four bits is present at SDO and the lead bit has been obtained from latch 24a, not from register 26a so that the register's lead bit position or stage, 78 is irrelevant to the operation and it makes no matter that the data input from SDIN will obliterate it in stage 78. In fact, the ability to have the lead bit already in place in advance of the read operation enables the system, even though operating on only five wires to keep the data in on line SDIN in phase with the data out on line SDO, so that the system can be used even in daisy chain applications.

The embodiment shown in FIG. 5 is just one way that the invention can be implemented. For example, while the SCLK is sampling SDIN on rising edges, it may do so on falling edges. SDO may be not valid before the SYNCB is low but become valid only after the SYNCB goes low. SDO could become valid on the first falling SCLK clock edge after SYNCB has gone low, and therefore be valid on the first rising SCLK edge but there would be the additional constraint that the first SCLK edge during a SYNCB low period would be falling not rising.

Figure 6A:
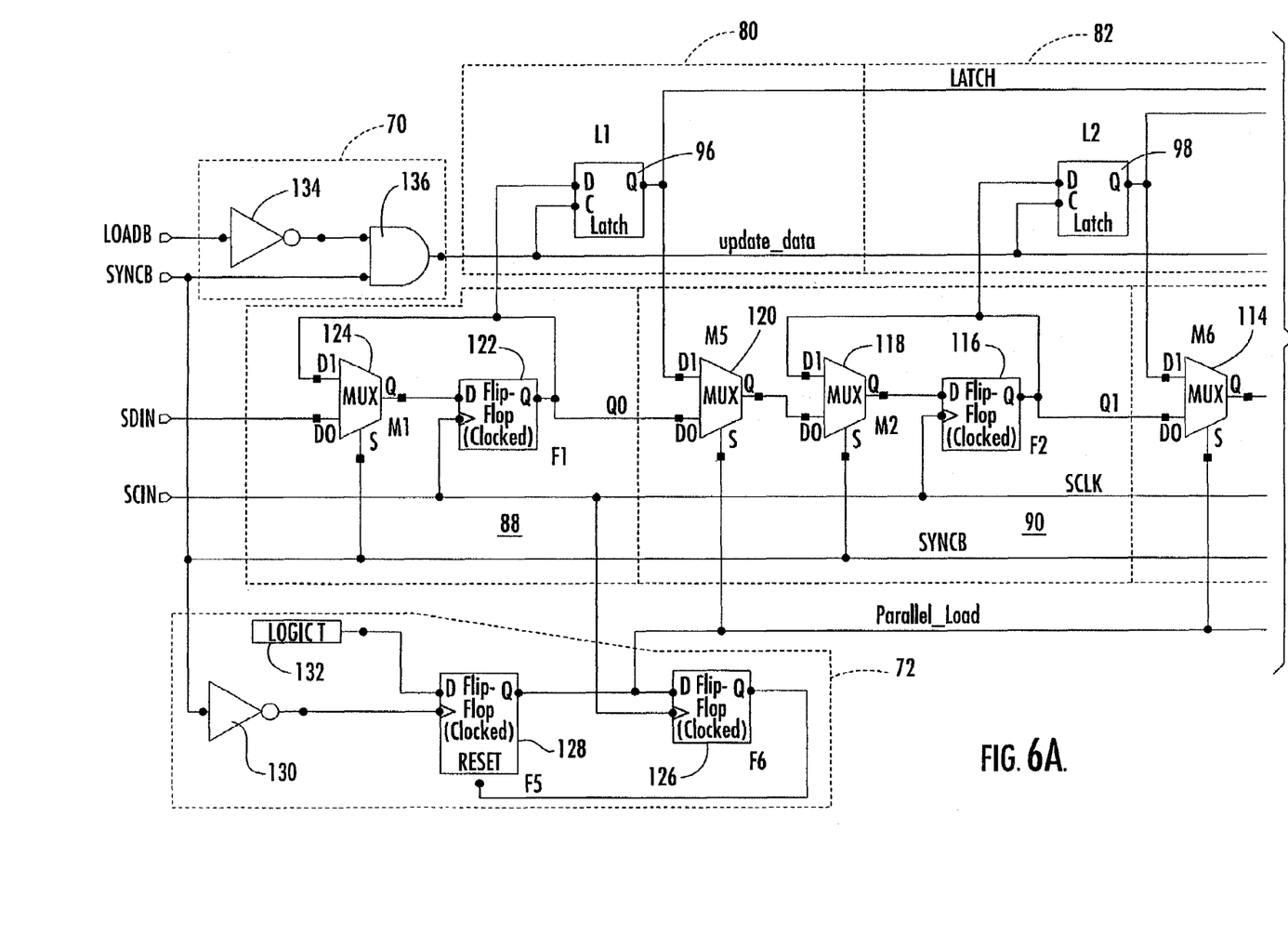
FIG. 6 is a more detailed schematic block diagram of the interface system of FIG. 5.
Figure 6B:
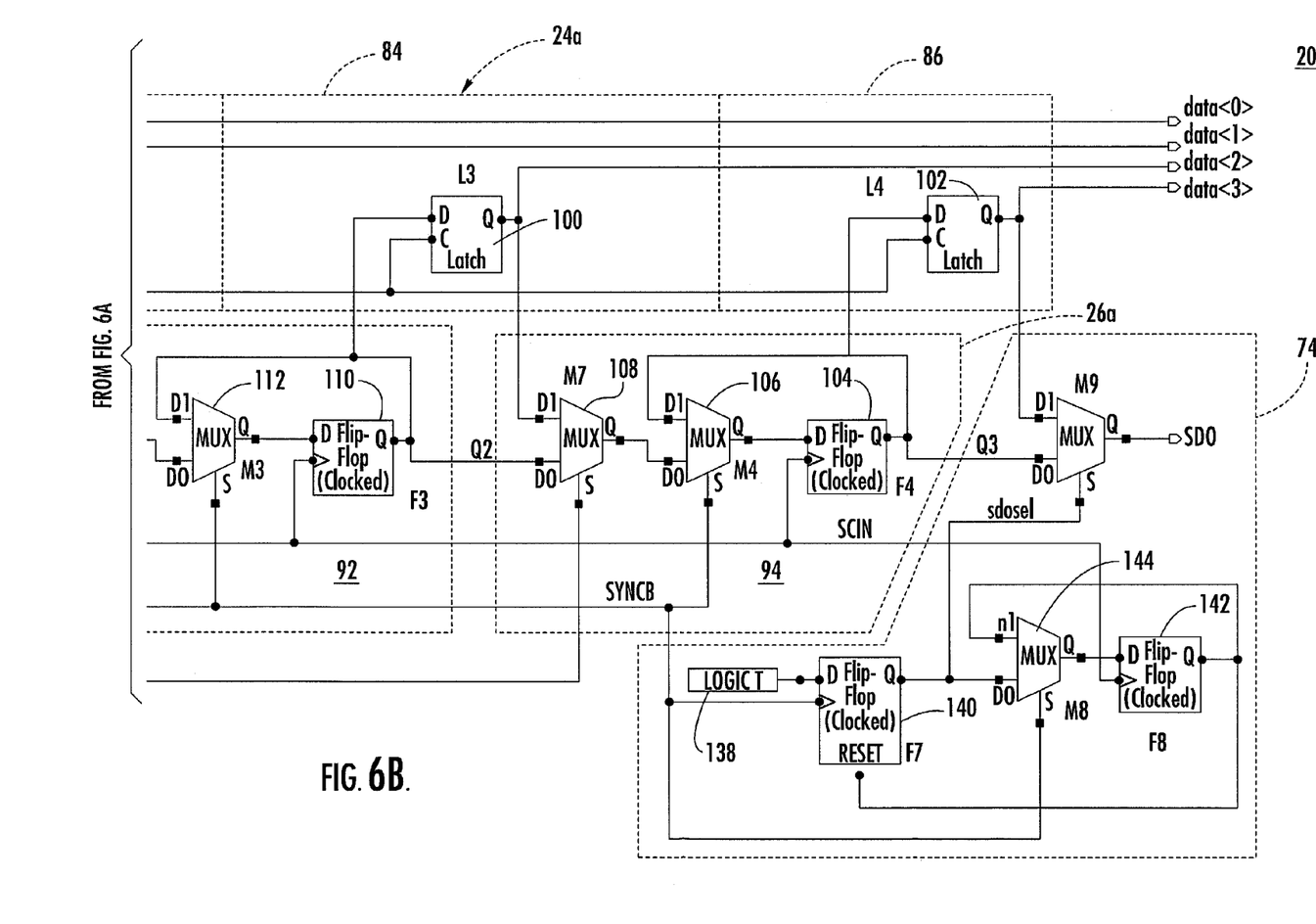

Latch 24a is shown illustratively as including four stages 80, 82, 84, and 86, while register 26a includes four stages 88, 90, 92, and 94. The number of stages of course depends only upon the number of bits in the set desired to be processed. A much more detailed schematic of the specific embodiment shown in FIG. 5 is illustrated in FIG. 6, where it can be seen that each stage, 80, 82, 84, and 86 of latch 24a includes a latch circuit 96, 98, 100, and 102, respectively. Each stage 88, 90, 92, and 94 of register 26a includes a flip-flop and two muxes 104, 106, 108, in stage 94, 110, 112, 114, in stage 92, 116, 118, 120, in stage 90, and a flip-flop 122 and only one mux 124 in stage 88. Parallel load circuit 72 includes flip-flops 126 and 128 and inverting amplifier 130 responsive to the SYNCB line and a circuit 132 which is a source of logic 1. Latch enable circuit 70 also includes an inverting amplifier 134 which is responsive to the LOADB line and an AND gate 136 which responds to the output of inverting amplifier 134 and the SYNCB line. Latch/register select circuit 74 also includes a circuit 138 which is a source of logic 1, which in conjunction with the SYNCB signal drives flip-flop 140. Flip-flop 142 is operated by the SCLK signal and the output from mux 144 which in turn is driven by the output from flip-flop 140 at one input and the output from flip-flop 142 at the other. Many different constructions may be used to implement the embodiments shown in FIG. 5 and that embodiment is only one of many ways to implement the invention.

The invention may be embodied in a read-write interface method for a peripheral device as well as a hardware system. The method applies to a peripheral device which includes a latch circuit for storing data to be processed by a peripheral device, a shift register for receiving a set of input data bits and a latch enable circuit for transferring the set of input data bits from the shift register to the latch circuit in a write operation. The method includes accessing a leading bit of the set of input data bits from the latch circuit in advance for a read operation and enabling in a read operation the rest of the input data bits in the latch circuit to be transferred to the shift register to be output with the leading bit.

The invention also contemplates a five line read-write interface method for a peripheral device which includes a latch circuit for storing data to be processed by a peripheral device, a shift register for receiving on an input line a set of input data bits and a latch enable circuit responsive to a LOADB line and a SYNCB line for transferring the set of input data bits from the shift register to the latch circuit in a write operation.

The method includes delivering to an output line in response to a clock signal and the SYNCB signal a leading bit of the input data bits from the latch circuit before the next cycle of the clock signal in advance of a read operation and enabling in a read operation the rest of the input data bits in the latch circuit to be transferred to the shift register and reunited with the leading bit at the output line.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. A read-write interface system for a peripheral device comprising:
   a latch circuit for storing data to be processed by the peripheral device;
   a shift register for receiving a set of input data bits;
   a latch enable circuit for transferring said set of input data bits from said shift register to said latch circuit in a write operation;
   a select circuit for accessing a leading bit of said set of input data bits from said latch circuit in advance of a read operation and providing the leading bit to an output line; and
   a parallel load circuit for enabling in the read operation a rest of said input data bits in said latch circuit to be transferred to said shift register to be output with said leading bit.

2. A five line read-write interface system for a peripheral device comprising:
   a latch circuit for storing data to be processed by the peripheral device;

a shift register for receiving on an input line a set of input data bits;

a latch enable circuit responsive to a LOADB line and a SYNCB line for transferring said set of input data bits from said shift register to said latch circuit in a write operation;

a select circuit responsive to a clock line and said SYNCB line to deliver to an output line a leading bit of said input data bits from said latch circuit before the next cycle of a clock signal on said clock line in advance of a read operation; and a parallel load circuit responsive to said clock and SYNCB lines for enabling in the read operation a rest of said input data bits in said latch circuit to be transferred to said shift register and reunited with said leading bit at said output line.

3. A read-write interface system for a peripheral device which includes a latch circuit for storing data to be processed by the peripheral device, a shift register for receiving a set of input data bits, and a latch enable circuit for transferring the set of input data bits from the shift register to the latch circuit in a write operation; the read-write interface system comprising:

a select circuit for accessing a leading bit of the set of input data bits from the latch circuit in advance of a read operation and providing the leading bit to an output line; and a parallel load circuit for enabling in the read operation a rest of that input data bits in the latch circuit to be transferred to the shift register to be output with the leading bit.

4. A read-write interface system for a peripheral device comprising:

means for storing data to be processed by the peripheral device;

means for receiving a set of input data bits;

means for transferring said set of input data bits from said means for receiving to said means for storing in a write operation;

means for accessing a leading bit of said set of input data bits from said means for storing in advance of a read operation and providing the leading bit to an output line; and means for enabling in the read operation a rest of said input data bits in said means for storing to be transferred to said means for receiving to be output with said leading bit.

5. A read-write interface system for a peripheral device including a means for storing data to be processed by the peripheral device, means for receiving a set of input data bits, and means for transferring the set of input data bits from the means for receiving to the means for storing in a write operation, the read-write interface system comprising:

means for accessing a leading bit of the set of input data bits from the means for storing in advance of a read operation and providing the leading bit to an output line; and means for enabling in the read operation a rest of the input data bits in the means for storing to be transferred to the means for receiving to be output with the leading bit.

6. A five line read-write interface system for a peripheral device which includes a latch circuit for storing data to be processed by the peripheral device, a shift register for receiving on an input line a set of input data bits, and a latch enable circuit responsive to a LOADB line and a SYNCB line for transferring the set of input data bits from the shift register to the latch circuit in a write operation, comprising:

a select circuit responsive to a clock line and the SYNCB line to deliver to an output line a leading bit of the input data bits from the latch circuit before the next cycle of a clock signal on the clock line in advance of a read operation; and a parallel load circuit responsive to the clock and SYNCB lines for enabling in the read operation a rest of the input data bits in the latch circuit to be transferred to the shift register and reunited with the leading bit at the output line.

7. A five line read-write interface system for a peripheral device comprising:

means for storing data to be processed by the peripheral device;

means for receiving on an input line a set of input data bits;

means responsive to a LOADB line and a SYNCB line for transferring said set of input data bits from means for receiving to said means for storing in a write operation;

means responsive to a clock line and said SYNCB line to deliver to an output line a leading bit of said input data bits from said means for storing before the next cycle of a clock signal on said clock line in advance of a read operation; and means responsive to said clock and SYNCB lines for enabling in the read operation a rest of said input data bits in said means for storing to be transferred to said means for receiving and reunited with said leading bit at said output line.

8. A five line read-write interface system for a peripheral device which includes means for storing data to be processed by the peripheral device, means for receiving on an input line a set of input data bits, and means responsive to a LOADB line and a SYNCB line for transferring the set of input data bits from the means for receiving to the means for storing in a write operation, comprising:

means responsive to a clock line and said SYNCB line to deliver to an output line a leading bit of said input data bits from said means for storing before the next cycle of a clock signal on said clock line in advance of a read operation; and means responsive to said clock and SYNCB lines for enabling in the read operation a rest of said input data bits in said means for storing to be transferred to said means for receiving and reunited with said leading bit at said output line.

9. A five line read-write interface method for a peripheral device including a latch circuit for storing data to be processed by the peripheral device, a shift register for receiving on an input line a set of input data bits, and a latch enable circuit responsive to a LOADB line and a SYNCB line for transferring said set of input data bits from the shift register to the latch circuit in a write operation, the method comprising:

delivering to an output line, in response to a clock signal and the SYNCB signal, a leading bit of the input data bits from the latch circuit before the next cycle of the clock signal in advance of a read operation; and enabling in the read operation a rest of the input data bits in the latch circuit to be transferred to the shift register and reunited with the leading bit at the output line.

10. A read-write interface method for a peripheral device including a latch circuit for storing data to be processed by the peripheral device, a shift register for receiving a set of input data bits, and a latch enable circuit for transferring the set of input data bits from the shift register to the latch circuit in a write operation, the method comprising:

accessing a leading bit of the set of input data bits from the latch circuit in advance of a read operation and providing the leading bit to an output line; and enabling in the read operation a rest of the input data bits in the latch circuit to be transferred to the shift register to be output with the leading bit.

* * * * *